UNITED STATES PATENT OFFICE.

ALFRED SPRINGER, OF CINCINNATI, OHIO.

IMPROVEMENT IN PROCESSES OF TREATING FATS.

Specification forming part of Letters Patent No. 187,327, dated February 13, 1877; application filed November 24, 1876.

*To all whom it may concern:*

Be it known that I, Doctor ALFRED SPRINGER, of the city of Cincinnati, Hamilton county, Ohio, have invented a new and useful Manufacture of Edible Tallow, of which the following is a specification:

My invention relates to a novel process for the conversion of suet and other animal fats into an article suitable for kitchen or table use, and which will retain its agreeable and proper savor and odor in all temperatures.

I have found equal injury to accrue to the fat in the process of rendering by heating, either at a too low or too high a temperature. In fact, the only heat that can be used without any risk is from 140° to 145° Fahrenheit. I have also observed that both water and the cellular membranes have a bad effect on the fat while it is being heated.

The fat must be cleansed thoroughly by washing in cold water, but not dried by mechanical pressure or by heat, because necessitating a consumption of time that gives opportunity for putrefaction to set in.

My process is as follows: The crude fat having been subjected to several washings in cold water, and then heated in a jacket-kettle to 140° Fahrenheit, my first charge of antiseptics is applied, namely, to each thousand pounds of fat I add thirty pounds of common salt, five pounds of saltpeter, two pounds of borax, one-fourth of a pound of boracic acid, and one-fourth of a pound of salicylic acid. These agents becoming dissolved by the watery portions, serve to prevent decomposition during the cooking process, and, combining with the membraneous matters, cause their precipitation; they also, by increasing the specific gravity of the water, enable its complete separation from the melted fat, which is thus enabled to float on top, whence it can be easily drawn off.

The chemicals employed in the above described stage of the process are necessarily sacrificed in performing their duty as precipitants, leaving the fat intact. The fat thus purified is fitted for immediate use, without further treatment of any kind; but, for long preservation or shipment to distant places, it is necessary to treat it to a second charge of antiseptics, consisting of common salt, one pound; saltpeter, four ounces; borax, four ounces; boracic acid, one ounce; salicylic acid, one ounce, and benzoric acid, a quarter of an ounce. These ingredients having been well incorporated with the purified fat, in a warm kettle, the tallow is ready for package and shipment to any distance or climate.

I am aware that it has been proposed to rectify crude fat by the application thereto of albumen and common salt, in conjunction with heat. In preference to albumen, which is at best a mere precipitant, I prefer to use the agents hereinbefore specified, for the following reasons: So far from adding to the decomposable ingredients, they render the ingredients of the fat proper less subject to decomposition, and by superceding the necessity of excessive salting, avoid the deliquescent effects thereof. They in fact preserve intact the natural odor and savor, which the salt alone will not do; besides which, from their powerful antiseptic qualities, a very much smaller relative quantity suffices.

I do not claim novelty in the use of a specified moderate heat alone, such heat being prescribed in patent No. 138,629, to R. Gaggin, nor do I claim alone the use of common salt in connection with heat, as such means form part of the process described in patent No. 154,251, to J. Hobbs; said process, however, being one for the manufacture of an artificial or imitation butter, with which my product has nothing in common.

I claim as new and of my invention—

The process of producing edible fat or tallow by heating the crude fat at a temperature of 140° to 145° Fahrenheit, in contact with common salt, saltpeter, borax, and boracic and salicylic acids, withdrawing the separated fat and incorporating therewith a second and smaller charge of the above chemicals, with the addition of benzoic acid, in the manner set forth.

In testimony of which invention I hereunto set my hand.

DR. ALFRED SPRINGER, Ph. D.

Attest:
   GEO. H. KNIGHT,
   HARRY E. KNIGHT.